July 17, 1956
R. R. DENMAN
2,754,627
SWINGING SHEAR AND SPRAY
Filed June 2, 1954
2 Sheets-Sheet 1
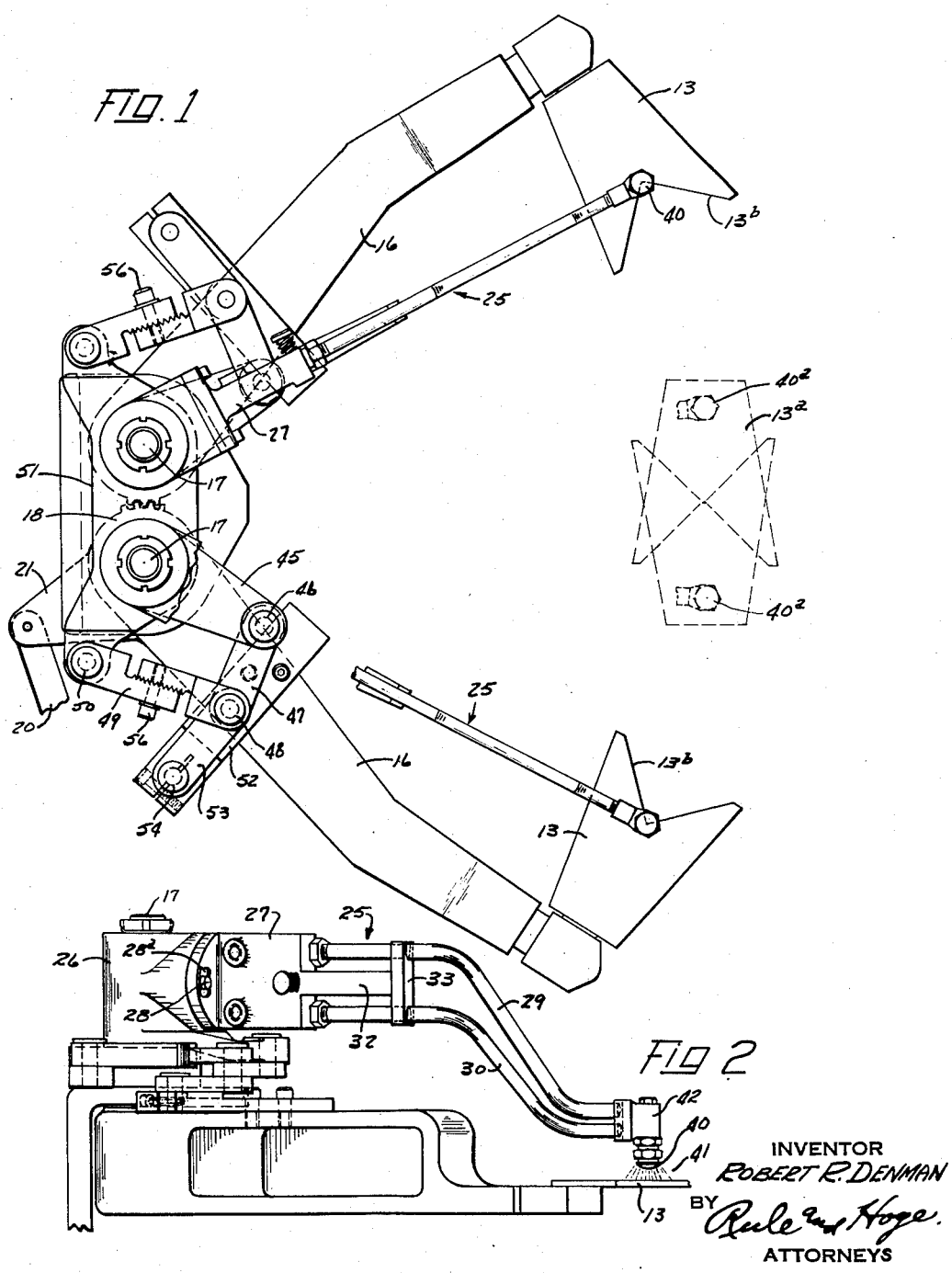
INVENTOR
ROBERT R. DENMAN
BY
Rule and Hope
ATTORNEYS July 17, 1956  R. R. DENMAN  2,754,627
SWINGING SHEAR AND SPRAY
Filed June 2, 1954  2 Sheets-Sheet 2
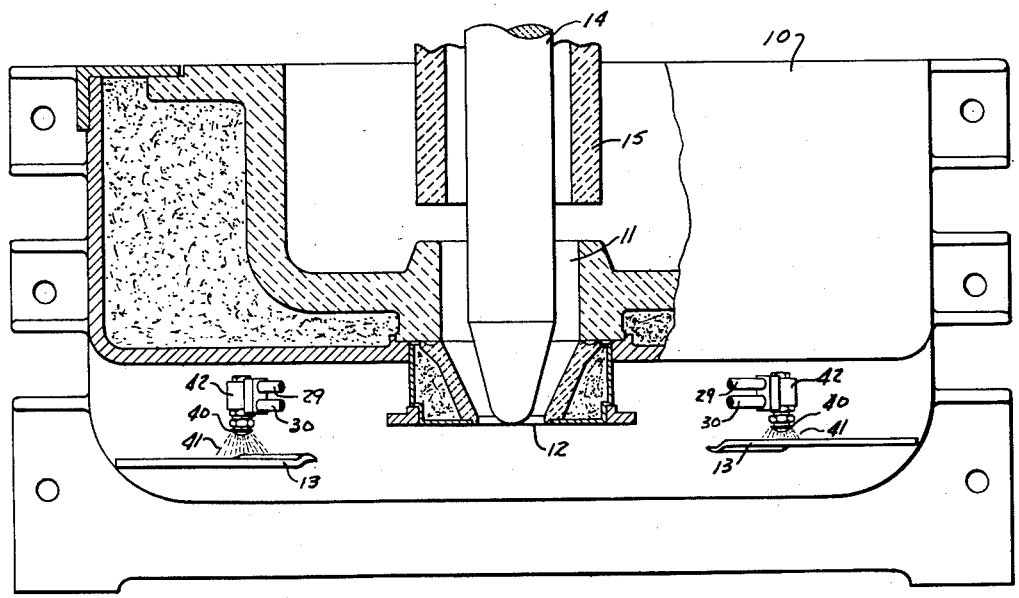
Fig. 3
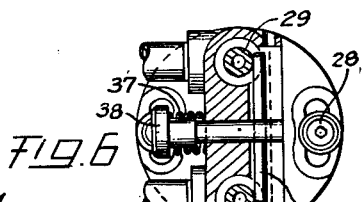
Fig.6
Fig.4
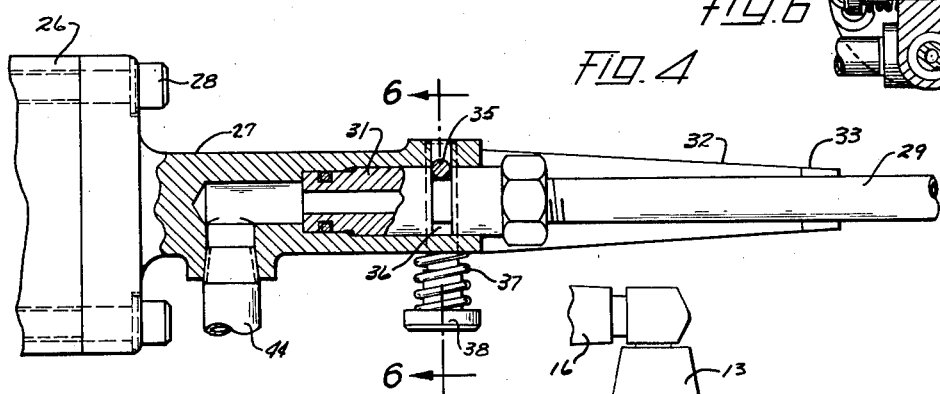
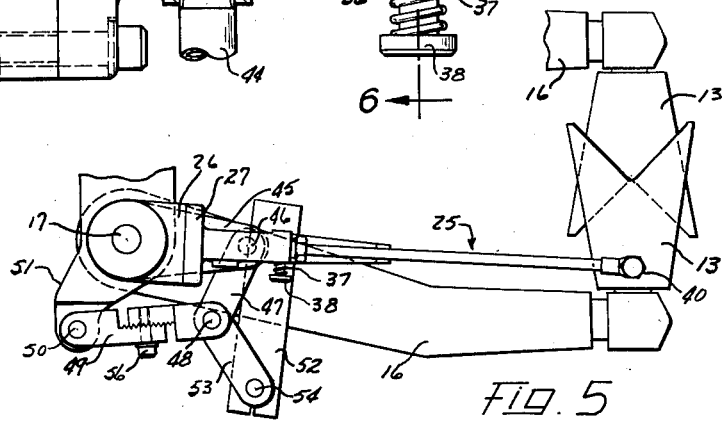
Fig. 5
INVENTOR
ROBERT R. DENMAN
BY
ATTORNEYS United States Patent Office 2,754,627
Patented July 17, 1956

2,754,627

SWINGING SHEAR AND SPRAY

Robert R. Denman, Columbus, Ohio, assignor to Owens-Illinois Glass Company, a corporation of Ohio Application June 2, 1954, Serial No. 434,015

10 Claims. (Cl. 49—14)

My invention relates to apparatus for spraying with a coolant and/or lubricating fluid, shears which are used for severing molten or plastic material at a high temperature. The invention as herein illustrated is of utility in the glass art and is shown as used with known or conventional shearing mechanism which severs formed gobs or mold charges from a supply body of molten glass issuing from a furnace forehearth. Apparatus of this character comprises a pair of shear blades which swing into and out of position to sever the issuing mold charges of molten glass. It is customary to cool and lubricate the shear blades by spraying them with a suitable fluid while they are in retracted position. The spraying nozzles are stationary and only apply the fluid while the shear blades are in their retracted position as the spray nozzles cannot be carried with the shears into the path of the issuing molten glass. The length of time during which the spray can be applied is thus limited. At high speeds of the feeder the available spraying time becomes shorter, whereas the need for adequate lubrication and cooling increases. With such high speed operation the spraying is inadequate with the result that the drop-severing operation of the shears is defective, the life of the blades is shortened and an excessive amount of the spraying material is required.

An object of the present invention is to provide a means for overcoming or eliminating these objections and to provide for adequate spraying of the shears while operating at high frequency. For this purpose the invention provides spraying means combined with the shear mechanism in a manner to swing or move with the shear blades during a major portion of the shearing operation. The apparatus may include a pair of shear arms mounted to swing horizontally for moving the shear blades to and from the glass severing position. The invention provides spray nozzles mounted and arranged to move with the shear blades during a portion of their movement to and from the shearing position, thus increasing the length of time the spray nozzles are directing the spray material against the shear blades.

Referring to the accompanying drawings which illustrate the invention as used in connection with a conventional form of glass feeding and shearing mechanism:

Fig. 1 is a plan view of the apparatus, the shears being shown in full lines in their retracted position;

Fig. 2 is a side elevational view of the same;

Fig. 3 is a part sectional front elevation of the feeder;

Fig. 4 is a part sectional elevation of a spray arm, portions being broken away;

Fig. 5 is a plan view of one of the shear arms in its forward or severing position; and Fig. 6 is a section at the line 6—6 on Fig. 4.

Referring to Fig. 3, the glass feeder comprises a forehearth 10 into which molten glass flows from a melting and refining tank. The forehearth is formed with a well 11 with a bottom outlet orifice 12 through which the molten glass issues. The issuing glass is suspended in the form of gobs or mold charges which are severed by a pair of shears 13. The issuance of the glass and formation of the mold charges or gobs is controlled by a vertically reciprocating plunger 14 and tube 15, the tube and plunger being reciprocated in a conventional manner in cooperation with the movements of the sheer blades.

As shown in Fig. 1 the blades 13 are carried on shear arms 16 mounted on vertical pivot pins 17. The shears are connected to swing in unison by a pair of intermeshing gears 18. The shears may be swung to and from their open or retracted position to the severing or closed position 13ª (shown in dotted lines), by an arm 20 pivoted to a rock arm 21 connected to one of the shear arms. The gob feeding and shearing apparatus as above detailed is old in the art.

The spraying mechanism comprises a pair of spray arms 25 individual to the shear arms 16 and mounted for limited swinging movement about the axes of the pivot pins 17. Each arm or unit 25 comprises a bearing block or head 26 mounted to swing about a pivot pin 17 and having connected thereto a bracket 27 attached to the head by bolts 28. Elongated openings 28ª (Fig. 2) through which the bolts extend, permit rotative adjustment of the spray arms. Pipes 29 and 30, forming part of the spray arm 25, are connected to the bracket 27 by tubular connectors or pipe sections 31 (Fig. 4). The pipes 29 and 30 have screw-threaded connection with the sections 31. The bracket 27 is formed with an integral arm 32 extending forwardly therefrom and carrying at its outer end a yoke 33. The ends of the yoke are recessed to receive the pipes 29, 30. The pipe sections 31 are removably held in the bracket 27 by a holding device (Figs. 4 and 6) comprising a rod 35 mounted in the bracket and seated in annular recesses 36 in the tube sections 31. The rod 35 extends through an opening in the stem of a knob 38 and is held in position by a coil spring 37.

Each of the spraying arms carries at its forward end a spray nozzle 40 by which the cooling and lubricating fluid 41 is sprayed onto the shear blade 13 directly therebeneath. The nozzle 40 is connected to a mixing chamber 42 in communication with the pipes 29 and 30. The coolant may comprise water or air or a mixture of the same or other cooling fluids. A suitable lubricating fluid may also be supplied. The fluids are supplied to the spray arms through pipes 44 (Fig. 4).

The mechanism for swinging the spray arms 25 is as follows: rock arms 45, individual to the spray arms 25 have a fixed connection to the head 26 so that they swing with the spray arms about the axes of the pivots 17. Each arm 45 is connected by a pivot pin 46 to a link 47 pivoted at 48 to a link 49. The links 49 are connected by pivots 50 to a stationary plate 51. Each of the shear arms has mounted thereon a horizontal bar or plate 52 for swinging movement with the arm. Links 53 are connected by pivots 54 to the plate 52 and by the pivots 48 to the links 47. Each pair of links 47, 53 provides a toggle connection between the shear arm 16 and the rock arm 45 (fixed to the spray arm).

While the shears are in retracted position the spray nozzles 40 are directly over the cutting edges 13ᵇ of the shear blades. As the shear arms swing inwardly the spraying arms 25 are also swung inwardly with them, by the toggle linkage connections just described, with only a slight relative movement of the spraying arms and shear arms, through a greater portion of the inward movement of the shear arms. As the shear blades approach the glass severing position the movement of the arms 25 is retarded or slowed down, preventing the spray nozzles from coming in contact with or into the path of the molten glass, so that the nozzles are brought to rest in the dotted line positions 40ª (Fig. 1) when the shear blades reach their closed position. It will be seen that with such construction and operation, spray 41 is directed against the shearing edges of the blades 13 during a greater portion of the time that the shears are moving as well as while they are at rest in their retracted position. This provides effective cooling and lubrication of the shears during high speed operation and without waste of the fluids which occurs with prior art apparatus in which the spray nozzles have a stationary mounting.

The links 49 are preferably made in sections so that the links are adjustable in length. The sections are held in adjusted position by clamping bolts 56. By lengthening or shortening the links 49 the positions of the spray nozzles and particularly the limit of inward swinging movement may be adjusted as desired.

Modifications may be resorted to within the spirit and scope of my invention.

I claim:

1. The combination of a shear blade mounted for forward movement from a retracted position to a shearing position and back to its retracted position, a spray nozzle mounted in position to direct a spray against the shear blade while the latter is in its retracted position, and mechanism interconnected between the blade and nozzle by which the nozzle is caused to move forward concurrently with the forward movement of the shear blade and direct a spray against the shearing edge of the shear blade during a portion of its forward movement, said interconnected mechanism comprising means for reducing the forward movement of the nozzle relative to that of the blade during a succeeding portion of the forward movement of the blade and thereby shifting the relative position of the nozzle and blade during said forward movement of the shear blade.

2. The apparatus defined in claim 1, the movement of the blade being in a horizontal direction, the spray nozzle being positioned directly over the cutting edge of the shear blade during a portion of the shearing movement and withdrawn from its said position over the cutting edge while the latter is in the shearing position.

3. The combination of a shear blade mounted to swing from a retracted position at one side of and below a bottom outlet opening of a glass feeder through which molten glass is extruded, to a shearing position directly beneath the outlet, a spray nozzle mounted directly over the shear blade in position to direct a spray against the cutting edge portion of the blade while the latter is in its retracted position, means for supplying a spray fluid to the said nozzle, and means for moving the nozzle concurrently with the shear blade and maintaining it over the shear blade during a substantial portion of the movement of the blade to and from shearing position and for relatively moving the blade and nozzle during the shearing stroke of the blade in a direction and to an extent to withdraw the nozzle from its position directly over the cutting edge portion of the blade.

4. The combination of a shear arm, a shear blade attached to the arm at one end thereof, said arm being mounted for swinging movement about a pivot at the other end thereof, from a retracted position to a forward or severing position, a spray arm mounted to swing about said pivot, a spray nozzle carried on the spray arm and positioned to direct a spray against the cutting edge portion of the shear blade when the shear arm is in its retracted position, and interconnecting means between the shear arm and the spray arm for causing the spray nozzle to move forward toward said shearing position during at least a portion of the foward movement of the shear arm, said interconnecting means being operative to produce a movement of the spray nozzle relative to that of the shear arm during the forward movement of the shear arm, by which the spray nozzle is withdrawn from its position, relative to the shear blade, for directing a spray against the said cutting edge.

5. The apparatus defined in claim 4, said interconnecting means including means to effect relative movement of the said arms in a direction and of such amplitude that the spray nozzle is withdrawn from a position relative to the shear blade for directing a spray against said cutting edge during the final forward movement of the shear arm.

6. The combination of a shear arm, a shear blade mounted on said arm at one end thereof, said arm being pivotally mounted at its opposite end for horizontal swinging movement about an axis from a retracted position below and at one side of a bottom outlet of a glass feeder to a glass severing position directly beneath said outlet, a spray arm mounted to swing about said axis and extending in the general direction of the shear arm, a spray nozzle carried by the spray arm at the forward end thereof, means providing a channel extending through the spray arm to the nozzle, the latter being positioned to direct a spray against the cutting edge of the shear blade while the latter is in its retracted position, and interconnected mechanism between the shear arm and spray arm by which the spray nozzle is carried forward concurrently with the forward movement of the shear blade during a portion of the forward stroke and its movement relatively to the said cutting edge of the blade retarded during the final forward movement of the shear arm.

7. The combination of a shear arm, means for mounting the arm in a horizontal position for horizontal swinging movement about a pivot at one end thereof, a shear blade carried at the free end of said arm, means for swinging the arm from a retracted position to a shearing position, spraying means comprising a spray arm pivotally mounted at one end thereof for swinging about said pivot, a spray nozzle at the free end of the spray arm, means for supplying a spraying fluid to said nozzle, said nozzle being positioned to direct a spray against the shearing edge of the shear blade while the latter is in its retracted position, and interconnected mechanism between the said arms for moving the spray arm and nozzle during the movement of the shear arm toward and from shearing position and causing the nozzle to be advanced and retracted with the shear blade, said interconnected mechanism including a pair of toggle links forming a connection between the said arms and a link pivoted at one end to the toggle links and at its opposite end to a stationary support.

8. The combination of a pair of horizontal shear arms mounted below a feeder outlet for horizontal swinging movement about stationary axes, shear blades carried by said arms and movable therewith from a retracted position to a shearing position directly beneath the outlet, spraying mechanism including spray arms pivoted to swing about the said axes of the shear arms, spray nozzles carried at the free ends of the spray arms and positioned and arranged to direct a spray against the shear blades while the latter are in their retracted position, and means providing operating connections between the spray arms and the shear arms for carrying the nozzles forward as the blades advance toward the shearing position and maintaining the nozzles in operative relation to the shear blades during a portion of the movement of the blades toward shearing position and retarding the movement of the nozzles relatively to the said movement of the blades during a portion of said movement of the blades.

9. The apparatus defined in claim 8, each said spray arm comprising pipes extending lengthwise of the arm, a mixing chamber at the forward ends of said pipes and carrying said spray nozzle, and means providing conduits through which spraying fluid is conducted to said pipes.

10. The apparatus set forth in claim 9, each spray arm including a pivot head by which the arm is pivotally mounted and a connector between said head and pipes, the said conduits being extended through said connector, and means for releasably attaching the pipes to said connector and permitting the pipes to be disconnected as a unit from the connector.

References Cited in the file of this patent

UNITED STATES PATENTS 1,864,277    Tucker et al.              June 21, 1932